United States Patent
Ringe et al.

(10) Patent No.: US 10,489,315 B2
(45) Date of Patent: Nov. 26, 2019

(54) DYNAMIC ADAPTATION OF DIRECT MEMORY TRANSFER IN A DATA PROCESSING SYSTEM WITH MISMATCHED DATA-BUS WIDTHS

(71) Applicant: ARM LTD, Cambridge (GB)

(72) Inventors: Tushar P. Ringe, Austin, TX (US); Jamshed Jalal, Austin, TX (US); Phanindra Kumar Mannava, Austin, TX (US); Mark David Werkheiser, Austin, TX (US); Ramamoorthy Guru Prasadh, Austin, TX (US); Gurunath Ramagiri, Austin, TX (US)

(73) Assignee: Arm Limited, Cambridge (GB)

( * ) Notice: Subject to any disclaimer, the term of this patent is extended or adjusted under 35 U.S.C. 154(b) by 106 days.

(21) Appl. No.: 15/696,672

(22) Filed: Sep. 6, 2017

(65) Prior Publication Data
US 2019/0073324 A1    Mar. 7, 2019

(51) Int. Cl.
| | |
|---|---|
| *G06F 13/16* | (2006.01) |
| *G06F 13/364* | (2006.01) |
| *G06F 13/42* | (2006.01) |
| *G06F 13/28* | (2006.01) |
| *G06F 13/40* | (2006.01) |

(52) U.S. Cl.
CPC ......... *G06F 13/1678* (2013.01); *G06F 13/28* (2013.01); *G06F 13/364* (2013.01); *G06F 13/4018* (2013.01); *G06F 13/4282* (2013.01); *G06F 13/1673* (2013.01)

(58) Field of Classification Search
CPC .. G06F 13/1673; G06F 13/1678; G06F 13/28; G06F 13/364; G06F 13/4018; G06F 13/4282
See application file for complete search history.

(56) References Cited

U.S. PATENT DOCUMENTS

| | | | | |
|---|---|---|---|---|
| 4,716,527 | A * | 12/1987 | Graciotti | G06F 13/4018 703/25 |
| 5,280,598 | A * | 1/1994 | Osaki | G06F 13/4018 710/310 |
| 2004/0243739 | A1* | 12/2004 | Spencer | G06F 13/28 710/22 |
| 2007/0091707 | A1* | 4/2007 | Hidaka | G11C 11/005 365/230.03 |
| 2015/0103822 | A1* | 4/2015 | Gianchandani | H04L 69/08 370/389 |

* cited by examiner

*Primary Examiner* — Eric T Oberly
(74) *Attorney, Agent, or Firm* — Leveque IP Law, P.C.

(57) ABSTRACT

A method and apparatus for controlling direct memory transfer (DMT) in a data processing system with mismatched bus-widths in which a home node automatically determines, from a read request received from a requestor node, whether DMT should be enabled or disabled dependent on the bus-widths of the requestor node and a target slave node and on the size of the access. Optionally, when the slave node has a smaller bus width than the requestor node, a data combiner at an upload port for the target slave node merges two or more data beats of requested data received from the target slave node to form a single wider beat and transmits the single wider beat to the requestor node. A counter may be used to determine when a data buffer in the data combiner has sufficient space to store data beats to be merged.

20 Claims, 6 Drawing Sheets

DYNAMIC ADAPTATION OF DIRECT MEMORY TRANSFER IN A DATA PROCESSING SYSTEM WITH MISMATCHED DATA-BUS WIDTHS

BACKGROUND

Many very large scale integrated (VLSI) circuits are configured in a modular manner, in which previously designed and tested functional circuit blocks (sometimes referred to as Intellectual Property (IP) blocks) or devices are linked together to form larger circuits. The devices may be processing cores, memory controllers or peripherals, for example. To facilitate this, common interfaces have been defined.

More complex integrated circuits, such as System-on-Chip (SoC) circuits and circuits having multiple processing cores, for example, may transport data using a dedicated interconnect structure such as a bus or network. Devices may be connected via the interconnect structure may have one or more defined interfaces that include a data-bus of a specified width. An integrated circuit with multiple functional blocks may be configured as an interconnect network to enable efficient communication between functional blocks.

Processing cores are configured to use caches. When requested data is not present in the cache (referred to as a cache-miss) a direct memory transfer (DMT) may be used to retrieve the data via a memory controller. However, an interconnect structure may be used to couple devices with mismatched data-bus widths systems, where the processing cores, interconnect structure and memory controllers have varying data-bus widths. In systems with mismatched bus-widths, DMT is disabled because of differences in data widths. This results in increased latency when responding to a read request.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
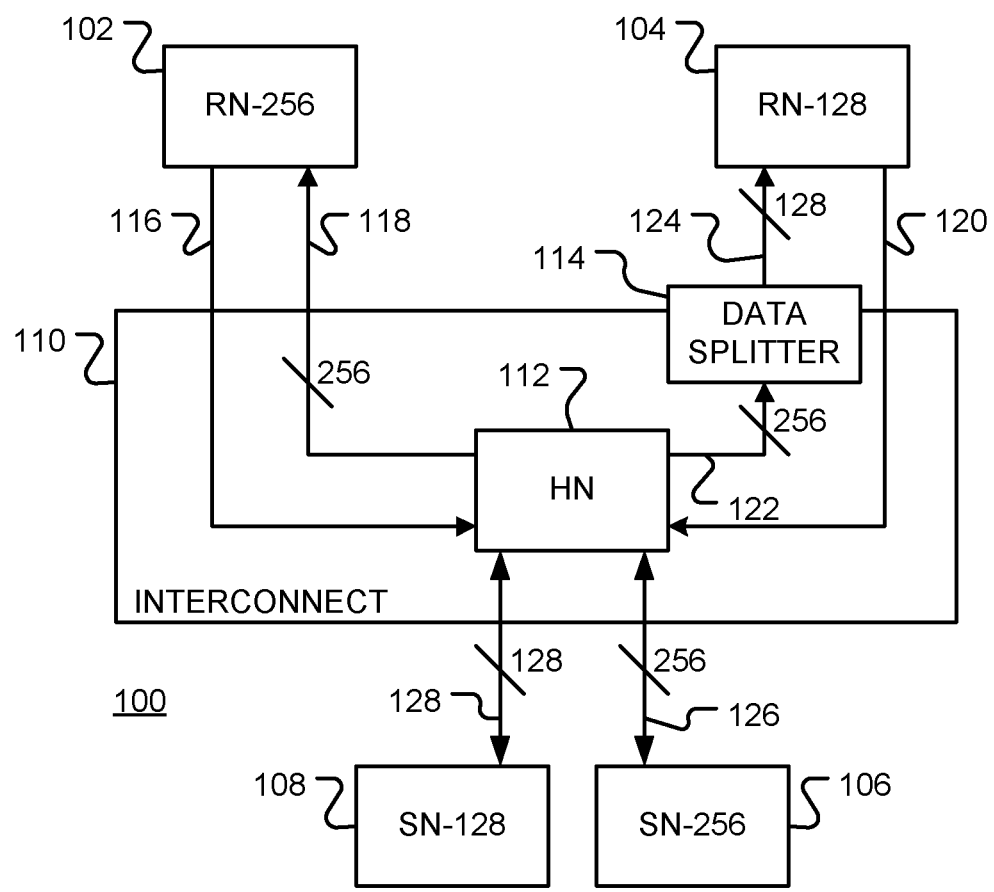
FIG. 1 is a block diagram of a data processing system.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The present disclosure relates to an implementation of direct memory transfer (DMT) in a data processing system having mismatched data-bus widths. Direct Memory Transfer (DMT) is a mechanism by which a slave agent, such as a memory controller, can transmit read data directly to a requesting agent, such as processing core, bypassing the home agent on the interconnect. This mechanism reduces the read data latency as seen by the requesting agent.

A data processing system may be configured as a network where requestor nodes (RN), such as processing cores, are coupled via an interconnect structure to slave nodes (SN), such as memory controllers. Data coherence may be managed by home nodes (HN), where each home node is coupled to one or more memory controllers of other slave nodes.

In accordance with certain embodiments, DMT is enabled in a data processing system by use of a home node (HN) that is configured to dynamically decide if DMT is to be used based on relative data-bus widths of the requestor node (RN), the slave node (SN) and the access-size (SIZE) of the requested transaction. In this manner, read latency in the event of a cache-miss is reduced.

FIG. 1 shows an example data processing system 100. The system includes processing cores (RN's), 102 and 104, and memory controllers (SN's), 106 and 108, with different data bus widths. The notation CRN-128 is used to indicate a node with 128-bit wide data buses, RN-256 is used to indicate a node with 256-bit wide data buses, etc. This, in the example shown, nodes 102 (RN-256) and 106 (SN-256) that have 256-bit data buses and nodes 104 (RN-128) and 108 (SN-128) that have 128-bit data buses. The nodes are coupled to the interconnect structure via upload or download ports for data transfer and further ports for transferring access requests. The nodes are coupled via interconnect structure 110, which is assumed to have a 256-bit data bus. Home node 112 is a protocol device that provides access to the slave nodes 106 (SN-256) and 108 (SN-128) and maintains data coherence.

Information packets are transmitted as signals corresponding to digits of a flow control unit (flit). A flit is the basic unit for information flow control through the network, and enables transactions to be performed between requestor and slave nodes coupled via the interconnect structure. Each transaction may consist of an address transfer from an RN to an SN and one or more data transfers. For a write transaction these data transfers will pass from the RN to the SN, while for a read transaction these data transfers will pass from the SN to the RN.

In addition to the actual data payload, a flit may contain information such as the requestor identifier (TxnID), a data identifier (DataID) that may indicate the position of a flit in an information packet, and a target identifier (TgtID) that identifies the target node for the flit.

Data may be transferred across a physical link as data beats. A data beat may be transferred at a clock edge, for example.

System 100 may include data splitters, such as data splitter 114, on interconnect structure 110, that operates to split wider transactions into multiple narrower ones to allow traffic movement from a wide bus to a narrow bus (for example from a 256-bit bus to a 128-bit bus). In addition, protocol devices (such as home node HN 112) may include a data combiner to manage merging of multiple narrow beats into a wider beat. Typically, HN 112 does not have knowledge of relative data-bus widths of the various nodes. Direct Memory Transfer (DMT) is disabled since there are no data combiners available on the direct path from narrow memory controllers, such as slave node 108 (SN-128) to wider processing cores, such as 102 (RN-256). When DMT is disabled in a system with mismatched data-bus widths, data-read latency on cache-misses is increased and performance is reduced.

In operation, a request from node 102 (RN-256) is sent on line 116 and data is returned on line 118. A request from node 104 (RN-128) is sent on line 120 and data is returned on line 122. For a system with a 256-bit interconnect and 256- or 128-bit nodes, there are three mismatched scenarios: RN-128 with SN-256, RN-128 with SN-128 and RN-256 with SN-128. These are described below with reference to FIGS. 2, 3 and 4.

Figure 2:
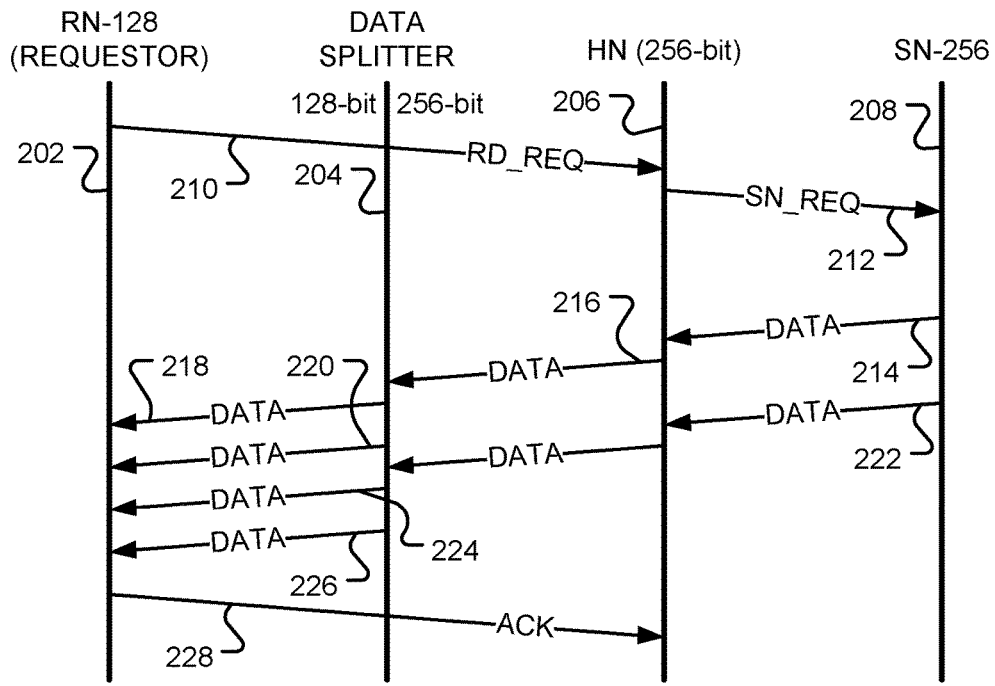
FIG. 2 is a signal flow chart of transactions in a data processing system with mismatched data-bus widths.

FIG. 2 is a signal flow chart 200 of transactions in a data processing system with mismatched data-bus widths. In this example, the bus width of the requestor node (RN-128) is 128-bits, the bus width of the memory controller (SN-256) is 256 bits and the interconnect bus width is 256 bits. In the figure, line 202 indicates a time line for the requestor node (RN-128), line 204 indicates a time line for a data splitter, line 206 indicates a time line for the home node (HN-256), and line 208 indicates a time line for the memory controller or slave node (SN-256). In a typical coherent transaction flow, a read request (RD_REQ) in transaction 210 arrives at a home node from a requestor (RN-128). Since the home node knows that the system has mismatched data-bus widths, the home node issues a non-DMT request in transaction 212 (SN_REQ) to SN-256 when a cache-miss occurs. Request 212 is processed by SN-256 and SN-256 delivers data (DATA) in data beat 214 to the home node. The home node sends the data back to the requestor via the data splitter. The data splitter receives a 256 bit data beat 216 and splits it into two 128 bits data beats 218 and 220 that can be accepted by the requestor RN-128. If 512 bits of data were requested, for example for a cache line containing 64 bytes, a second data beat 222 is sent providing data beats 224 and 226 to the requestor. The requestor may acknowledge receipt of the data in acknowledgment 228.

The approach shown in FIG. 2 is not optimal for several reasons. Firstly, latency as seen by the requestor (RN-128) is high since the data is transferred through the home node creating additional hop. Secondly, data bandwidth is not utilized efficiently, since the home node upload/download slots are occupied by SN data. These slots are not available for other data beats.

Figure 3:
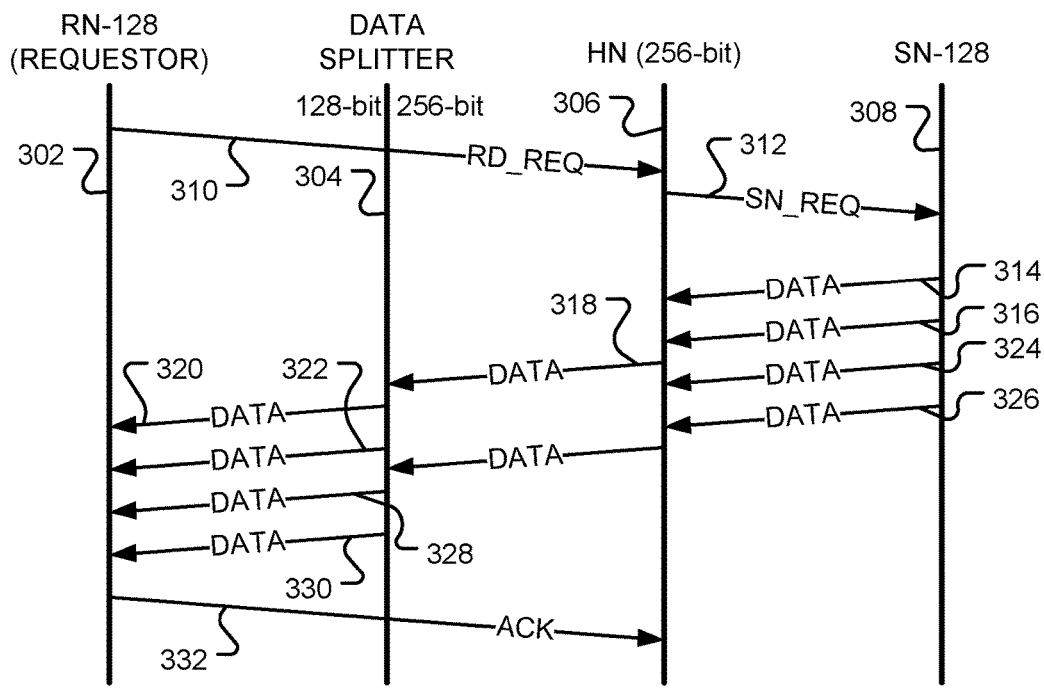
FIG. 3 is a further signal flow chart of transactions in a data processing system with mismatched data-bus widths.

FIG. 3 is a further signal flow chart 300 of transactions in a data processing system with mismatched data-bus widths. In this example, bus width of the requestor node (RN-128) is 128-bits, the bus width of the memory controller (SN-128) is 128 bits and the interconnect bus width is 256 bits. In the figure, line 302 indicates a time line for the requestor node (RN-128), line 304 indicates a time line for a data splitter, line 306 indicates a time line for the home node (HN-256), and line 308 indicates a time line for the memory controller or slave node (SN-128). In a typical coherent transaction flow, a read request (RD_REQ) in transaction 310 arrives at the home node from the requestor (RN-128). Since the home node knows that the system has mismatched data-bus widths, the home node issues a non-DMT request in transaction 312 (SN_REQ) to SN-128 when a cache-miss occurs. Request 312 is processed by SN-128 and SN-128 delivers 128 bit DATA to the home node in data beats 314 and 316. The home node then combines the two 128 bit beats into a single 256 bit beat 318 and sends the data back to the requestor. The home node sends the data back to the requestor via the data splitter. The data splitter receives a 256 bit data beat 318 and splits it into two 128 bits data beats 320 and 322 that can be accepted by the requestor RN-128. If 512 bits of data were requested, for example for a cache line containing 64 bytes, two more 128 bit data beats, 324 and 326, are sent providing data beats 328 and 330 to the requestor. The requestor may acknowledge receipt of the data in acknowledgment 332.

The approach shown in FIG. 3 is not optimal for several reasons. Firstly, latency as seen by the requestor (RN-128) is high since the data is transferred through the home node creating additional hop. Secondly, data bandwidth is not utilized efficiently, since the home node upload/download slots are occupied by SN data. These slots are not available for other data beats. In addition, data beats are getting combined and split even though RN and SN have the same data bus-widths, resulting in additional latency.

Figure 4:
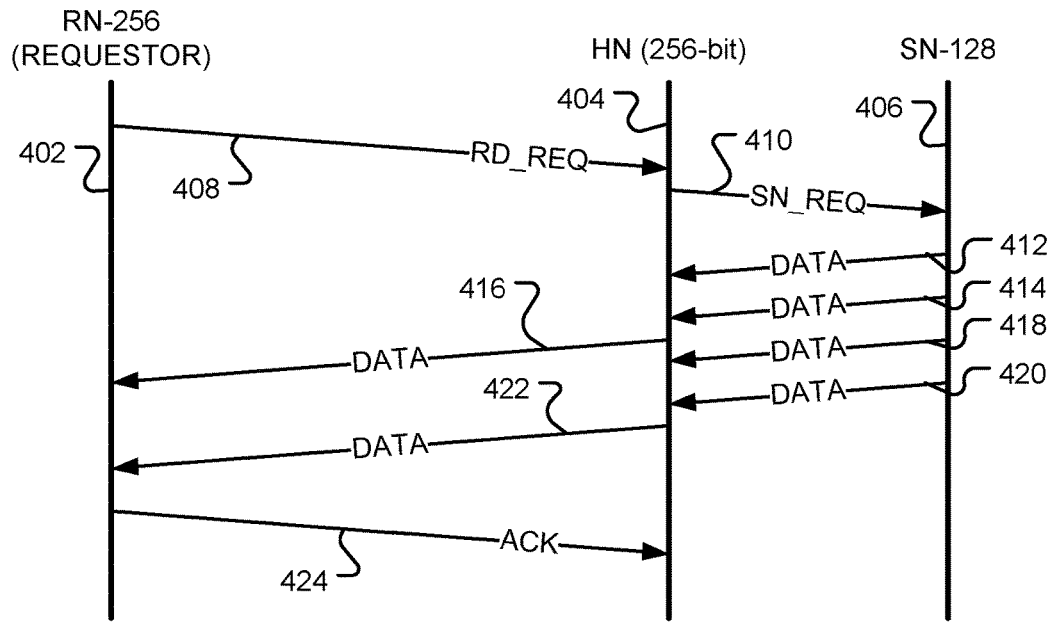
FIG. 4 is a still further signal flow chart of transactions in a data processing system with mismatched data-bus widths.

FIG. 4 is a further signal flow chart 400 of transactions in a data processing system with mismatched data-bus widths.

In this example, bus width of the requestor node (RN-256) is 256-bits, the bus width of the memory controller (SN-128) is 128 bits and the interconnect bus width is 256 bits. In the figure, line 402 indicates a time line for the requestor node (RN-256), line 404 indicates a time line for the home node (HN-256), and line 406 indicates a time line for the memory controller or slave node (SN-128). In a typical coherent transaction flow, a read request (RD_REQ) in transaction 408 arrives at the home node from the requestor (RN-256). Since the home node knows that the system has mismatched data-bus widths, the home node issues a non-DMT request in transaction 410 (SN_REQ) to SN-128 when a cache-miss occurs. Request 410 is processed by SN-128 and SN-128 delivers 128 bit DATA to the home node in data beats 412 and 414. the home node then combines the two 128 bit beats into single 256 bit beat 416 and sends the data back to the requestor. If 512 bits of data were requested, for example for a cache line containing 64 bytes, two more 128 bit data beats, 418 and 420, are sent providing data beat 422 to the requestor. The requestor may acknowledge receipt of the data in acknowledgment 424.

The approach shown in FIG. 4 is not optimal for several reasons. Firstly, latency as seen by the requestor (RN-128) is high since the data is transferred through the home node creating additional hop. Secondly, data bandwidth is not utilized efficiently, since the home node upload/download slots are occupied by SN data. These slots are not available for other data beats.

In accordance with a first aspect of the disclosure, information is provided to a home node when a given request arrives at the home node and the home node decides to start request to a given SN. The provided information includes:

1) The data-bus width of the requestor (RN_BW). This information is obtained by the requestor presenting its data bus width using a user-defined field called "SRC-TYPE" in the request (REQ) flit. In one embodiment, this field is populated by the interconnect structure when the REQ flit is uploaded from the requestor (RN) onto a cross-point (XP) of the interconnect structure, since the cross-point is aware of the data-bus width of the RN.

2) The data-bus width of the memory controller (SN_BW). This information may be stored in a control register (denoted as SN_CTL) in the home node which has the knowledge of data bus width of SNs disambiguated by NODEID. In one embodiment, the SN_CTL control register is programmed by a user at boot time and specifies data-bus widths of all the SN's that a given home node can talk to.

3) The access size of the request (TRANS SIZE). For example, this may be the size, in bytes, of the access. The may be between 1 byte to 64 bytes, for example, and may be specified in a SIZE field of the REQ flit.

Using above information, the HN decides whether to send a Direct Memory Transfer (DMT) request or not based on TABLE 1 below.

TABLE 1

HN Decision Table.

| No. | RN_BW | SN_BW | TRANS_SIZE | DMT? | Comment |
|---|---|---|---|---|---|
| 1 | 256 b | 256 b | <32 bytes | Yes | Same Data-Bus widths for RN and SN |
| 2 | 256 b | 256 b | ≥32 bytes | Yes | Same Data-Bus widths for RN and SN |
| 3 | 256 b | 128 b | <32 bytes | No | Sub-cache line beats can't be combined |
| 4 | 256 b | 128 b | ≥32 bytes | No | No Data Combiner on Interconnect |
| 5 | 128 b | 256 b | <32 bytes | No | Sub-cache line beats can't be split |
| 6 | 128 b | 256 b | ≥32 bytes | Yes | Data Splitter will split wider beat into narrower beats |
| 7 | 128 b | 128 b | <32 bytes | Yes | Same Data-Bus widths for RN and SN |
| 8 | 128 b | 128 b | ≥32 bytes | Yes | Same Data-Bus widths for RN and SN |

As seen from the HN decision table, TABLE 1, five of the eight cases can enable direct memory transfer (DMT). Assuming that probability of each case is equal in a given system, this will result in the number of DMT requests being increased by approximately 62%. In turn, this provides a reduction in the overall average latency read transactions in the system.

In accordance with a second aspect of the disclosure, one or more data combiner modules are provided within the interconnect structure so that DMT can be done for case number 4 in TABLE 1 (HN Decision table). For this case, the memory controller (SN) data-width is less than that of the requestor and the size of data access is greater than or equal to 32 bytes. The resulting decision table is shown in TABLE 2.

TABLE 2

HN Decision Table with Data Combiner.

| No. | RN_BW | SN_BW | TRANS_SIZE | DMT? | Comment |
|---|---|---|---|---|---|
| 1 | 256 b | 256 b | <32 bytes | Yes | Same Data-Bus widths for RN and SN |
| 2 | 256 b | 256 b | ≥32 bytes | Yes | Same Data-Bus widths for RN and SN |

TABLE 2-continued

HN Decision Table with Data Combiner.

| No. | RN_BW | SN_BW | TRANS_SIZE | DMT? | Comment |
|---|---|---|---|---|---|
| 3 | 256 b | 128 b | <32 bytes | No | Sub-cache line beats can't be combined |
| 4 | 256 b | 128 b | ≥32 bytes | Yes | Data Combiner on Interconnect |
| 5 | 128 b | 256 b | <32 bytes | No | Sub-cache line beats can't be split |
| 6 | 128 b | 256 b | ≥32 bytes | Yes | Data Splitter will split wider beat into narrower beats |
| 7 | 128 b | 128 b | <32 bytes | Yes | Same Data-Bus widths for RN and SN |
| 8 | 128 b | 128 b | ≥32 bytes | Yes | Same Data-Bus widths for RN and SN |

In one embodiment, a data combiner module operates has one or more of the following properties:

1. The data combiner will coalesce two narrow data beats into one wider beat based on TxnId/DataId/TgtId fields of the data flit.
2. The data combiner will only be present at upload port in interconnect structure where a 128-bit wide SN is populated.
3. The data combiner will have a total of N entries that will be distributed among all HNs.
4. The data combiner will have a bypass mode for non-DMT data return.
5. Software configuration will be provided in a control register (SN_CTL) of each HN to indicate the maximum number of outstanding DMT requests (MAX_PEND_DMT_CNT) that are allowed to be sent.
6. The value of MAX_PEND_DMT_CNT will be set based on the number of HNs that can potentially target a given 128-bit SN. For example, if a data combiner has 16 entries and 4 HNs can target a given 128-bit SN, the value MAX_PEND_DMT_CNT will be set to 16/4=4.
7. A home node (HN) will maintain a current pending DMT counter (CURB_PEND_DMT_CNT) that increments every time a DMT request is sent to a 128-bit SN. The counter will decrement upon receipt of an acknowledgment (ACK) of receipt of the data by the requestor. This guarantees that the data combiner has been deallocated.
8. This scheme will work with out-of-order data returned from a SN. For example, using the DataID together with buffering in the data combiner, two or more flits may be stored and used to form a wider data response packet.
9. The data combiner will be a 'dumb' device that will wait for two beats of data to arrive before sending out one wider beat.

In this embodiment, the data combiner is used exclusively for DMT data return that starts from a 128-bit SN and for which that target is a 256-bit RN. A data combiner may have a bypass path for non-DMT requests.

When both aspects of the disclosure are implemented in a data processing system with mismatched data-bus widths, Direct Memory Transfers (DMT) is enabled in six of the eight cases listed in TABLE 2 above. This reduces the average data return latency, provides better utilization of the DAT channel in the interconnect structure, and also provides better overall throughput for the system.

Figure 5:
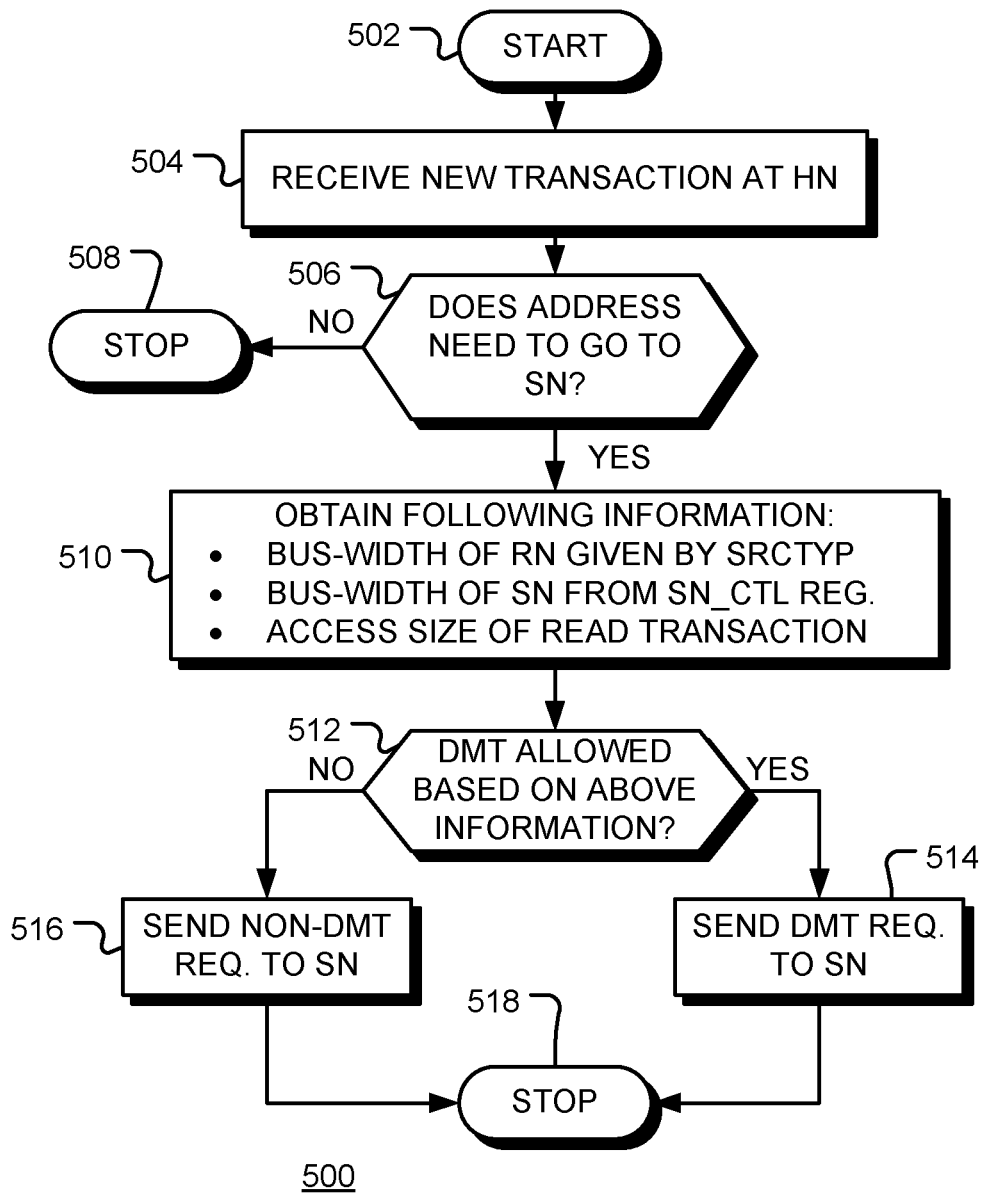
FIG. 5 is a flow chart of a method of operation for a data processing system, consistent with embodiments of the disclosure.

FIG. 5 is a flow chart of a method 500 of operation for a data processing system. Following start block 502, a new transaction is received at a home node (HN) of the system from a requestor node (RN) at block 504. If the target address of the transaction is not that of a slave node (SN), as depicted by the negative branch from decision block 506, the method terminates at block 508. If the transaction is targeted to a SN, as depicted by the positive branch from decision block 506, the HN retrieves the bus-width of the RN (from the SRCTYP field in the request), the bus-width of the target SN (from the SRCTYP control register in the HN, for example), and the access size of the transaction as shown in block 510. Based on this information, it is determined, at decision block 512, if a Direct Memory Transfer (DMT) should be made. This may be done, for example by using decision logic that implements TABLE 1 above. If a DMT is to be made, as depicted by the positive branch from decision block 512, a DMT request is sent to the target SN at block 514. Otherwise, as depicted by the negative branch from decision block 512, a non-DMT request is sent to the SN at block 516. The method terminates at block 518.

Figure 6:
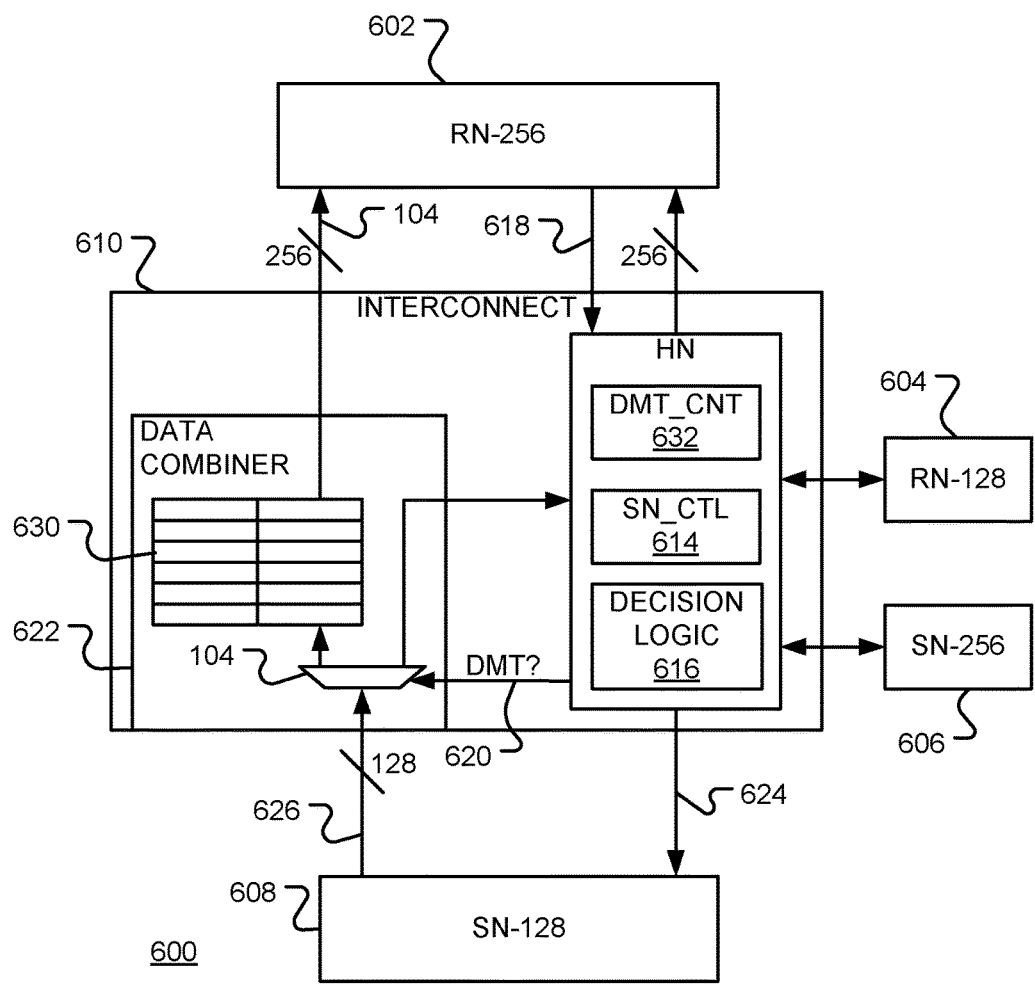
FIG. 6 is a block diagram of a data processing system consistent with certain embodiments of the disclosure.

FIG. 6 is a block diagram of a data processing system 600 consistent with certain embodiments of the disclosure. The system includes processing cores (RN's), 602 and 604, and memory controllers (SN's), 606 and 608, with different data bus widths. In the example shown, nodes 602 (RN-256) and 606 (SN-256) that have 256-bit data buses and nodes 604 (RN-128) and 608 (SN-128) that have 128-bit data buses. The nodes are coupled via interconnect structure 610, which is assumed to have a 256-bit data bus. Home node (HN) 612 is a protocol device that provides access the slave nodes 606 (SN-256) and 608 (SN-128) and maintains data coherence. HN 612 includes a control register 614 (SN_CTL) and decision logic 616. The control register 614 identifies the bus-widths of the SN's accessed by the HN. The decision logic 616 implements TABLE 1, discussed above. In operation, as discussed above with reference to FIG. 5, a request is received on link 618. The request may include a SRC-TYPE that indicates the bus-width of the requestor node, a target ID (TgtID) that identifies the target SN and a SIZE that indicates the number of bytes to be transferred. The target ID is used to access control register 614 to determine the bus-width of the target SN. Decision logic 616 receives the bus-width and SIZE information and determines if a direct memory transfer should be made. A corresponding request is sent to the appropriate SN.

In some embodiments, decision logic 616 also determines if the target SN (such as node 618 (SN-128)) has a smaller bus-width than the requestor node (such as node 602 (RN-256)). This decision is passed on signal line 620 to data combiner 622 and a request is sent on line 624. The requested data is passed to data combiner 622 on line 626. Multiplexer 628 is controlled by the DMT enable signal 620 to pass the request data back to HN 612 when DMT is disabled and to pass the requested data to data buffer 630 when DMT is enabled. A counter 632 (DMT_CNT) is incremented when a DMT transfer is requested and decremented when receipt of the data is acknowledged by the requestor node. If the counter is at a maximum value, the data buffer 630, or at least the part of it allocated to the target SN, is full and a non-DMT request is sent. Data combiner 622 is a 'dumb' device. It is configured to wait for two beats of 128-bit data to arrive from SN-128 (608) before sending out one wider beat of 256-bit data, via the interconnect to RN-256 (602). Operation of the system is summarized in FIGS. 7 and 8 discussed below.

Figure 7:
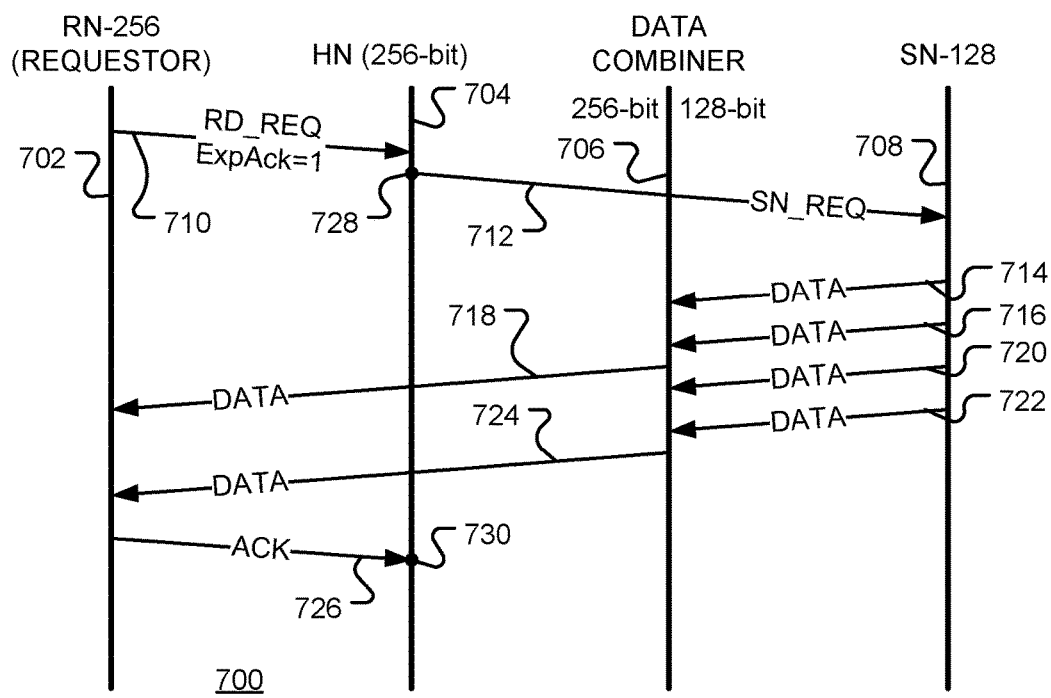
FIG. 7 is a signal flow chart of transactions in a data processing system with mismatched data-bus widths, consistent with embodiments of the disclosure.

FIG. 7 is a signal flow chart 700 of transactions in a data processing system with mismatched data-bus widths consistent with embodiments of the disclosure. In this example, bus width of the requestor node (RN-256) is 256-bits, the bus width of the memory controller (SN-128) is 128 bits and the interconnect bus width is 256 bits. In the figure, line 702 indicates a time line for the requestor node (RN-256), line 704 indicates a time line for the home node (HN-256), line 706 indicates a time line for a data combiner, and line 708 indicates a time line for the memory controller or slave node (SN-128). In a typical coherent transaction flow, a coherent read request (RD_REQ) in transaction 710 arrives at the home node (HN) from the requestor (RN-256). The read request indicates that the RN is willing to receive a shared copy of the requested data, but other types of read requests may be issued. The request specifies that ExpAck=1, i.e. that an acknowledgment should be expected from the RN when the requested data is received. Without an acknowledgment, the data combiner would not know when to deallocated space in its data buffer. The home node (HN) determines from the information in the request and from data in a control register (SN_CTL) that a DMT can be used and sends request (RD_REQ) in transaction 712 to the SN. In this example, since the HN is acting as the point of coherency in the system, the coherent RD_REQ from the requesting node does not propagate beyond the HN.

The SN sends 128-bit data flits 714 and 716 to the data combiner on consecutive beats, where they are combined into single 256-bit flit 718 that is returned to RN-256. If 512 bits of data were requested, for example for a cache line containing 64 bytes, two more 128 bit data flits, 720 and 722, are sent to the data combiner, providing 256-bit data beat 724 to the requestor. The requestor acknowledges receipt of the data in acknowledgment 726, allowing space in the data buffer in the data combiner to be deallocated. A DMT counter in the FIN is incremented at time 728 when a new DMT is requested, and is decremented at time 730 when receipt of the data is acknowledged by the requestor. In this way, data bandwidth is utilized efficiently, since no HN upload/download slots are occupied by SN data. These slots remain available for other data beats. This is also true in other cases where DMT is used without the data combiner, since returned data does not pass through the HN.

Figure 8:
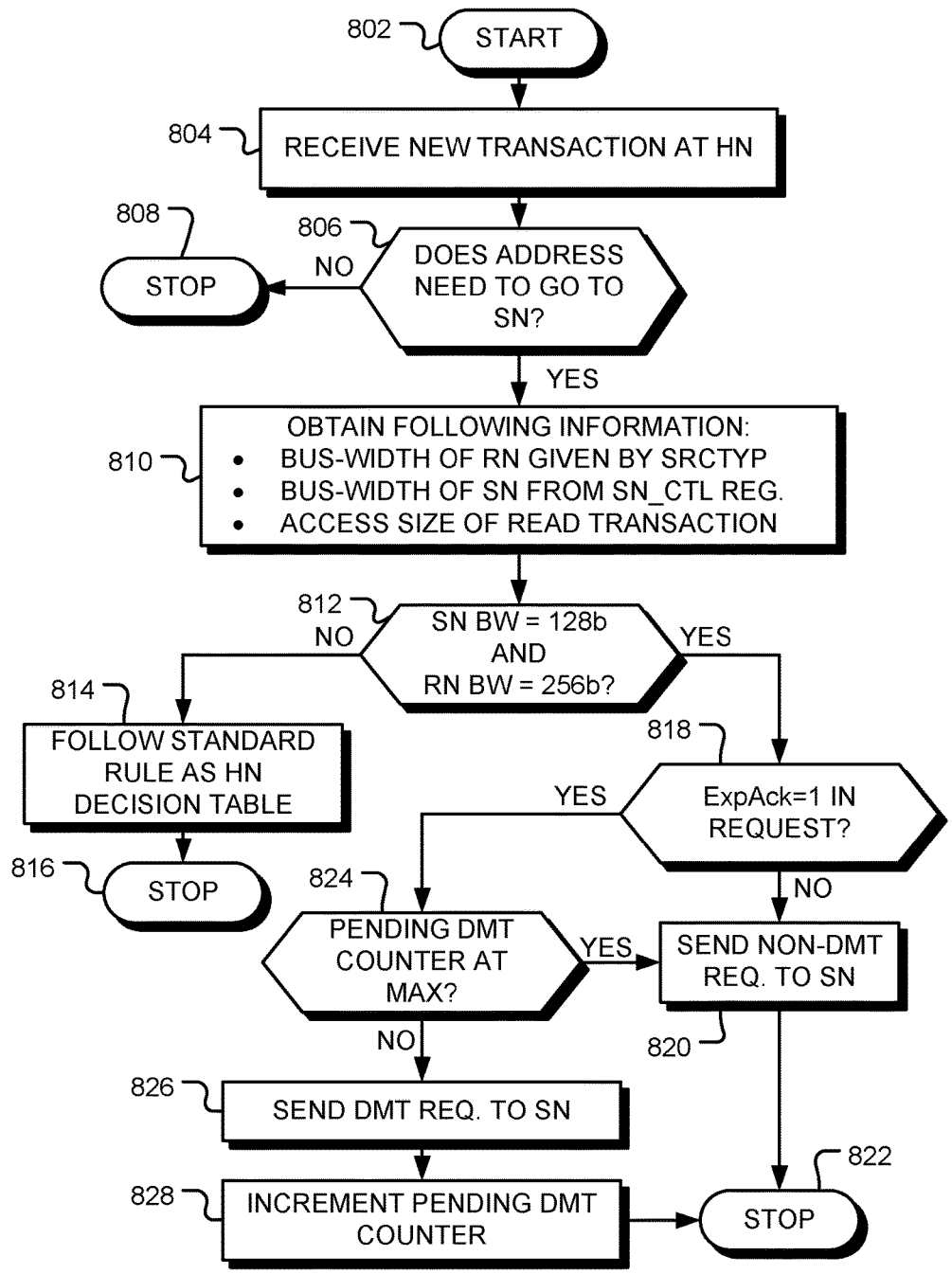
FIG. 8 is a flow chart of a further method of operation for a data processing system, consistent with embodiments of the disclosure.

FIG. 8 is a flow chart of a further method 800 of operation for a data processing system, consistent with embodiments of the disclosure. Following start block 802, a new transaction is received at a home node (HN) of the system from a requestor node (RN) at block 804. If the target address of the transaction is not that of a slave node (SN), as depicted by the negative branch from decision block 806, the method terminates at block 808. If the transaction is targeted to a SN, as depicted by the positive branch from decision block 806, the HN retrieves the bus-width of the RN (from the SRCTYP field in the request), the bus-width of the target SN (from the SRCTYP control register in the HN, for example), and the access size of the transaction as shown in block 810. If the SN bus-width is not 128-bits or the RN bus-width is not 256-bits, as depicted by the negative branch from decision block 812, flow continues to block 814 where the logic of TABLE 1 or TABLE 2 is used to determine if a DMT is to be requested. Optionally, the size of requested access is also used to determine if a DMT should be requested. In the examples shown in TABLE 1 and TABLE 2, the size is checked to see if SIZE≤32 bytes. The method ends at block 816. Otherwise, as depicted by the positive branch from decision block 812, flow continues to decision block 818. If ExpAck is not set to 1 in the request, to indicate that the data will be acknowledged when received by the RN, as depicted by the negative branch from decision block 818, a non-DMT request is sent to the SN at block 820 and the method terminates at block 822. Otherwise, if ExpAck=1 in the request, as depicted by the positive branch from decision block 818, the number of pending direct memory transfers is checked at decision block 824. If the number of DMTs pending is at the allowed maximum, as depicted by the positive branch from decision block 824, a non-DMT request is sent to the SN at block 820. Otherwise, a DMT request is sent to the SN at block 826 and the pending DMT counter is incremented at block 828. The method ends at block 822. The pending DMT counter is decremented upon receipt of an acknowledgment (ACK) of receipt of the data by the requestor.

It will be appreciated that some or all functions described herein could be implemented by custom logic, such a state machine, that has no stored program instructions in one or more application specific integrated circuits (ASICs), in reconfigurable logic such as an FPGA, or in one or more programmed processors having stored instructions. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such integrated circuits, software instructions and programs with minimal experimentation.

It will be appreciated that some or all functions described herein could be implemented in accordance with instructions of a Hardware Description Language or by a Netlist description. Such instructions or description may be stored and distributed on a computer readable medium and used in the design or implementation of a data processing system.

As used herein, the term processor, controller or the like may encompass a processor, controller, microcontroller unit (MCU), microprocessor, graphics processing unit (GPU), a digital signal processor (DSP), a field programmable gate array (FPGA), an application specific integrated circuit (ASIC) device, a memory controller or an I/O master device.

Those skilled in the art will recognize that the present disclosure has been described in terms of exemplary embodiments, but it not so limited. The present disclosure could be implemented using hardware components, such as special purpose hardware and/or dedicated processors which are equivalents to the disclosure as described and claimed. Similarly, general purpose computers, microprocessor based computers, micro-controllers, optical computers, analog computers, dedicated processors and/or dedicated hard wired logic may be used to construct alternative equivalent embodiments of the present disclosure.

Moreover, those skilled in the art will appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

Accordingly, some aspects and features of the disclosed embodiments are set out in the following numbered items:

1. A data processing system comprising: an interconnect structure comprising:
one or more download ports, a first download port of the one or more download ports being configured to supply data from the interconnect structure to a first requestor node, the first requestor node having a first bus-width; one or more upload ports, a first upload port of the one or more upload ports being configured to supply data from a target slave node to the interconnect structure, the target slave node having a second bus-width; and a home node configured to receive a first read request from the first requestor node and to transmit a corresponding second read request to the target slave node, where the home node comprises decision logic to indicate whether direct memory transfer (DMT) is to be enabled or disabled for transferring data requested in the first read request from the target slave node to the first requestor node, where the first and second bus-widths are not matched.

2. The data processing system of item 1, where the first read request includes an indicator of the first bus-width and an identifier of the target slave node, and where the home node comprises a slave node register indicating bus-widths of slave nodes coupled to the one or more upload ports, and where the decision logic is configured to: access the slave node register dependent upon the identifier of the target slave node to determine the second bus-width; and determine, dependent upon the first bus-width and the second bus-width, whether DMT is to be enabled or disabled for transferring the requested data from the target slave node to the first requestor node.

3. The data processing system of item 2, where determining if DMT is to be enabled or disabled is further dependent upon a size of the requested data access.

4. The data processing system of item 1, where the first bus-width is greater than the second bus-width, the method further comprising: a data combiner located at the first upload port, the data combiner being responsive to the home node and configured to merge two or more data beats of requested data received from the target slave node to form a single wider data beat for transmission to the first requestor node via the interconnect structure using DMT when the home node indicates DMT is enabled.

5. The data processing system of item 4, where DMT is disabled unless an acknowledgement is expected from the first requestor node on receipt of the requested data.

6. The data processing system of item 4, where the data combiner comprises a data buffer for storing data beats of requested data received from the target slave node when DMT is enabled.

7. The data processing system of item 6, where the home node further comprises a DMT counter that is incremented when a DMT is enabled for a read request and decremented when receipt of the requested data is acknowledged by the first requestor node.

8. The data processing system of item 7, where DMT is disabled when the DMT counter indicates that there is no more space in the data buffer is available for requested data from the target slave node.

9. The data processing system of item 1, where the decision logic comprises a lookup table.

10. A method for controlling direct memory transfers in a data processing system comprising one or more requestor nodes, a home node and one or more slave nodes, where a data-bus of a first requestor node of the one or more requestor nodes has a first bus-width and a data-bus of a target slave node of the one or more slave nodes has a second bus-width, the method comprising: receiving, at the home node of the data processing system, a first read request from the first requestor node, the first read request targeted to the target slave node; determining, from the first read request, the first bus-width and the second bus-width; enabling or disabling direct memory transfer (DMT) of the requested data from the target slave node to the first requestor node dependent on the first bus-width and the second bus-width; and transmitting, responsive to the first read request, a second read request to the target slave node.

11. The method of item 10, further comprising transmitting the requested data from the target slave node to the first requestor node via the home node when DMT is disabled.

12. The method of item 10, where the first read request includes an indicator of the first bus-width and an identifier of a target slave node and where the home node comprises a slave node register indicating bus-widths of the one or more slave nodes, the method further comprising: accessing the slave node register dependent upon the target slave node identifier to determine the second bus-width; and determining, dependent upon the first bus-width and the second bus-width, whether DMT is to be enabled or disabled for transferring the requested data from the target slave node to the first requestor node.

13. The method of item 12, where determining whether DMT is to be enabled or disabled is further dependent upon a size of the requested data access.

14. The method of item 10, further comprising, when DMT is enabled and the first bus-width is greater than the second bus width: merging, by a data combiner of the data processing system, two or more data beats of requested data received from the target slave node to form a single wider beat; and transmitting the single wider beat to the first requestor node.

15. The method of item 14, where merging two or more data beats of the requested data received from the target slave node to form the single wider beat comprises buffering data beats received from the target slave node in a data buffer of the data combiner.

16. The method of item 14, where determining whether DMT is to be enabled or disabled comprises: enabling DMT when, the first bus-width is greater than the second bus-width, the first requestor node is expected to acknowledge receipt of the requested data, and allotted space is available in a data buffer of the data combiner for storing data beats of the requested data received from the target slave node; and disabling DMT otherwise.

17. The method of item 16, further comprising: incrementing a DMT counter when DMT is enabled for a read request; and decrementing the DMT counter when receipt of the requested data is acknowledged by the first requestor node.

18. The method for item 17, further comprising disabling DMT when the DMT counter indicates that the data buffer has no more space available for data requested from the target slave node.

18. The method of item 14, further comprising disabling DMT unless an acknowledgement is expected from the first requestor node on receipt of the requested data.

20. The method of item 14, where transmitting the single wider beat to the first requestor node comprises transmitting the single wider beat to the first requestor via an interconnect structure of the data processing system.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

What is claimed is:

1. A data processing system comprising:
an interconnect structure comprising:
one or more download ports, a first download port of the one or more download ports being configured to supply data from the interconnect structure to a first requestor node, the first requestor node having a first bus-width;
one or more upload ports, a first upload port of the one or more upload ports being configured to supply data from a target slave node to the interconnect structure, the target slave node having a second bus-width; and
a home node configured to receive a first read request from the first requestor node and to transmit a corresponding second read request to the target slave node, where the home node comprises decision logic to indicate whether direct memory transfer (DMT) is to be enabled or disabled for transferring data requested in the first read request from the target slave node to the first requestor node,
where the first and second bus-widths are not matched,
where the first read request includes an indicator of the first bus-width and an identifier of the target slave node, and
where the decision logic is configured to determine, dependent upon the first bus-width indicated in the first read request and the second bus-width of the identified target slave node, whether DMT is to be enabled or disabled for transferring the requested data from the target slave node to the first requestor node.

2. The data processing system of claim 1, where the home node comprises a slave node register indicating bus-widths of slave nodes coupled to the one or more upload ports, and where the decision logic is configured to:
access the slave node register dependent upon the identifier of the target slave node to determine the second bus-width.

3. The data processing system of claim 1, where determining if DMT is to be enabled or disabled is further dependent upon a size of the requested data.

4. The data processing system of claim 1, where the first bus-width indicated in the first read request is greater than the second bus-width of the identified target slave node, the data processing system further comprising:
a data combiner located at the first upload port, the data combiner being responsive to the home node and configured to merge two or more data beats of requested data received from the target slave node to form a single wider data beat for transmission to the first requestor node via the interconnect structure using DMT when the home node indicates DMT is enabled.

5. The data processing system of claim 4, where DMT is disabled unless an acknowledgement is expected from the first requestor node on receipt of the requested data.

6. The data processing system of claim 4, where the data combiner comprises a data buffer for storing data beats of requested data received from the target slave node when DMT is enabled.

7. The data processing system of claim 6, where the home node further comprises a DMT counter that is incremented when DMT is enabled for a read request and decremented when receipt of the requested data is acknowledged by the first requestor node.

8. The data processing system of claim 7, where DMT is disabled when the DMT counter indicates that there is no more space in the data buffer is available for requested data from the target slave node.

9. The data processing system of claim 1, where the decision logic comprises a lookup table.

10. A method for controlling direct memory transfers in a data processing system comprising one or more requestor nodes, a home node and one or more slave nodes, where a data-bus of a first requestor node of the one or more requestor nodes has a first bus-width and a data-bus of a target slave node of the one or more slave nodes has a second bus-width, the method comprising:
receiving, at the home node of the data processing system, a first read request from the first requestor node, the first read request targeted to the target slave node, where the first read request includes an indicator of the first bus-width and an identifier of the target slave node;
determining, from the first read request, dependent upon the indicator of the first bus-width and the identifier of the target slave node, the first bus-width and the second bus-width;
enabling or disabling direct memory transfer (DMT) of the requested data from the target slave node to the first requestor node dependent on the first bus-width and the second bus-width; and
transmitting, responsive to the first read request, a second read request to the target slave node.

11. The method of claim 10, further comprising transmitting the requested data from the target slave node to the first requestor node via the home node when DMT is disabled.

12. The method of claim 10, where the home node comprises a slave node register indicating bus-widths of the one or more slave nodes, the method further comprising:

accessing the slave node register dependent upon the target slave node identifier to determine the second bus-width.

13. The method of claim 12, where determining whether DMT is to be enabled or disabled is further dependent upon a size of the requested data.

14. The method of claim 10, further comprising, when DMT is enabled and the first bus-width is greater than the second bus-width:
   merging, by a data combiner of the data processing system, two or more data beats of requested data received from the target slave node to form a single wider beat; and
   transmitting the single wider beat to the first requestor node.

15. The method of claim 14, where merging two or more data beats of the requested data received from the target slave node to form the single wider beat comprises buffering data beats received from the target slave node in a data buffer of the data combiner.

16. The method of claim 14, further comprising disabling DMT unless an acknowledgement is expected from the first requestor node on receipt of the requested data.

17. The method of claim 14, where said transmitting the single wider beat to the first requestor node comprises transmitting the single wider beat to the first requestor via an interconnect structure of the data processing system.

18. A method for controlling direct memory transfers in a data processing system comprising one or more requestor nodes, a home node and one or more slave nodes, where a data-bus of a first requestor node of the one or more requestor nodes has a first bus-width and a data-bus of a target slave node of the one or more slave nodes has a second bus-width, the method comprising:
   receiving, at the home node of the data processing system, a first read request from the first requestor node, the first read request targeted to the target slave node;
   determining, from the first read request, the first bus-width and the second bus-width;
   enabling or disabling direct memory transfer (DMT) of the requested data from the target slave node to the first requestor node dependent on the first bus-width and the second bus-width;
   transmitting, responsive to the first read request, a second read request to the target slave node; and
   when DMT is enabled and the first bus-width is greater than the second bus-width:
      merging, by a data combiner of the data processing system, two or more data beats of requested data received from the target slave node to form a single wider beat; and
      transmitting the single wider beat to the first requestor node,
   where determining whether DMT is to be enabled or disabled comprises:
      enabling DMT when, the first bus-width is greater than the second bus-width, the first requestor node is expected to acknowledge receipt of the requested data, and allotted space is available in a data buffer of the data combiner for storing data beats of the requested data received from the target slave node; and
   disabling DMT otherwise.

19. The method of claim 18, further comprising:
   incrementing a DMT counter when DMT is enabled for a read request; and
   decrementing the DMT counter when receipt of the requested data is acknowledged by the first requestor node.

20. The method for claim 19, further comprising disabling DMT when the DMT counter indicates that the data buffer has no more space available for data requested from the target slave node.

* * * * *